US006599626B1

(12) United States Patent
Cogen et al.

(10) Patent No.: US 6,599,626 B1
(45) Date of Patent: Jul. 29, 2003

(54) COAXIAL CABLE

(75) Inventors: Jeffrey Morris Cogen, Flemington, NJ (US); Sandra Germaine Mary Maki, Beaconsfield (CA)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/084,680

(22) Filed: May 26, 1998

(51) Int. Cl.[7] .......................... B32B 15/00; D02G 3/00

(52) U.S. Cl. ...................... 428/379; 428/383; 428/902; 428/920

(58) Field of Search ............................ 428/327, 403, 428/411.1, 480, 902, 920, 379, 383; 174/120 SR, 113 R

(56) References Cited

U.S. PATENT DOCUMENTS

| | | | | | |
|---|---|---|---|---|---|
| 3,660,438 | A | * | 5/1972 | Dexter | 260/404.5 |
| 3,773,722 | A | * | 11/1973 | Dexter | 260/45.75 C |
| 3,968,463 | A | | 7/1976 | Boysen | 333/96 |
| 3,975,473 | A | | 8/1976 | Mulvaney | 264/23 |
| 4,104,242 | A | * | 8/1978 | Kochanowski et al. | 260/40 R |
| 4,107,354 | A | | 8/1978 | Wilkenloh et al. | 427/118 |
| 4,139,936 | A | * | 2/1979 | Abrams et al. | 29/624 |
| 5,380,591 | A | * | 1/1995 | Keogh et al. | 428/379 |
| 5,453,322 | A | * | 9/1995 | Keogh et al. | 428/379 |
| 5,474,847 | A | * | 12/1995 | Keogh et al. | 428/379 |
| 5,502,288 | A | * | 3/1996 | Cogen et al. | 174/113 R |
| 5,575,952 | A | * | 11/1996 | Keogh et al. | 252/404 |
| 5,648,412 | A | * | 7/1997 | Mistry et al. | 524/189 |
| 5,766,761 | A | * | 6/1998 | Cogen et al. | 428/379 |
| 5,807,635 | A | * | 9/1998 | Cogen et al. | 428/379 |

* cited by examiner

*Primary Examiner*—Cynthia H. Kelly
*Assistant Examiner*—B. Shewareged

(57) ABSTRACT

A coaxial cable construction comprising (i) an inner electrical conductor comprising a single electrical conductor or a core of two or more electrical conductors;

(ii) dielectric insulation comprising an inert gas and a solid, said solid comprising (a) a polymer selected from the group consisting of polyethylene, polypropylene, fluoropolymers, and mixtures of two or more of said polymers and (b) an alkylhydroxyphenylalkanoyl hydrazine; and (iii) an outer electrical conductor.

7 Claims, No Drawings

COAXIAL CABLE

TECHNICAL FIELD

This invention relates to a coaxial cable construction, and, particularly, the dielectric insulation layer thereof

BACKGROUND INFORMATION

Coaxial cable is comprised of an inner conductor, typically copper or copper clad steel or aluminum; a dielectric insulation layer; and an outer conductor, for example, aluminum foil with aluminum or copper braid or tube. Signal attenuation in coaxial cables is a direct function of dissipation factor and dielectric constant of the dielectric layer, as described in the following equation:

$$\alpha=0.002387[e^{0.5}/(\log D_o/D_i)][P_o^{0.5}/D_o)+(P_i^{0.5}/D_i)]f^{0.5}+1.506\, f(df)e/(\log D_o/D_i)$$

wherein:

$\alpha$=attenuation in db/100 feet $D_o$=outside diameter of insulation in inches (inside diameter of outer conductor)

$D_i$=inside diameter of insulation in inches (outside diameter of inner conductor)

$P_o$=resistivity of outer conductor in micro-ohm-cm $P_i$=resistivity of inner conductor in micro-ohm-cm e=dielectric constant of insulation f=frequency in megahertz df=dissipation factor of insulation in radians Since polyethylene has excellent electrical properties, i.e., low dielectric constant and very low dissipation factor, it is one of the few materials that can be used as dielectric insulation in a coaxial cable. As the performance of coaxial cable continues to be pushed to higher frequencies where attenuation losses become more significant, small differences in insulation dissipation factor are increasingly critical to optimum cable performance.

In the most demanding coaxial cable applications, where it is desirable to transmit the electrical signal with as little loss or signal attenuation as possible, it is necessary to replace a portion of the dielectric insulation layer material with gas. This is normally achieved by injecting an inert gas such as nitrogen or argon during extrusion to create a foamed dielectric. With time, the inert gas may be slowly replaced by air through diffusion. Alternatively, a polymer dielectric comprising a tube with spacer disks or spiral spacers can be incorporated between the inner and outer conductors to provide gas (usually air) containing compartments, and hence reduce the dielectric constant. In the present case, the term "dielectric insulation" is used to describe all variations containing a mixture of gas and solid in the dielectric insulation layer.

Coaxial cables containing polyethylene or another resin in the dielectric layer usually require antioxidants to provide protection against loss of physical properties over time caused by oxidative degradation. Inclusion of antioxidants in the insulation has been considered a trade-off since there is usually a negative impact of such additives on the dissipation factor of the insulation, adversely affecting the initial cable electrical properties. Coaxial cables with dielectric insulation are typically stabilized with primary antioxidants, preferably those which were non-polar since it was believed that polarity was one cause of this negative impact. In any case, industry is seeking a coaxial cable construction, which provides long term thermal stabilization, which is at least as good as currently available coaxial cable containing typical primary antioxidants, together with substantially better electrical properties particularly low dissipation factor.

DISCLOSURE OF THE INVENTION

An object of this invention, therefore, is to provide a coaxial cable construction, which is thermally stable over long periods of time and has a low dissipation factor. Other objects and advantages will become apparent hereinafter.

According to the present invention, the object is met by a coaxial cable construction comprising (i) an inner electrical conductor comprising a single electrical conductor or a core of two or more electrical conductors; (ii) dielectric insulation comprising an inert gas or air and a solid, said solid comprising (a) a polymer selected from the group consisting of polyethylene, polypropylene, fluoropolymers, and mixtures of two or more of said polymers and (b) an alkylhydroxyphenylalkanoyl hydrazine; and (iii) an outer electrical conductor.

DESCRIPTION OF THE PREFERRED EMBODIMENT(S)

The coaxial cable of the present invention can be designed in various ways. One design includes an inner conductor coated with a foam dielectric insulation layer and an outer conductor covering the dielectric layer. An alternate design can be referred to as a disc and air design. In this case, the dielectric insulation layer is comprised of spaced solid polymeric discs molded onto the inner conductor. Typically, there are about six discs per foot of cable. The discs are about two inches apart thus forming adjacent compartments about two inches in length. A solid polymeric tube is extruded over the discs to hermetically seal the air space from adjacent compartments.

Both of these cable designs are used in applications where their low signal loss at high frequency provides a particular advantage. These applications include CATV cable for drop, distribution, and trunk; radio frequency cable for mobile telephones and two way radio; and various other communication cables.

Optionally, the coaxial cable can also contain an outer jacket, one or more layers of adhesive material, one or more flooding compounds, one or more braids, an armor layer, and a support member.

The inner (or core) conductor is usually a single electrical conductor, but can be several electrical conductors stranded together. The core conductor ranges in diameter from about 0.01 to about 2 inch for a single conductor. The inner conductor is typically made of copper, aluminum, copper clad aluminum, or copper clad steel and can be a solid or hollow tube, corrugated or smooth.

The dielectric insulation can be a solid or semi-solid expanded by chemical or physical means to produce a material that has a reduced dielectric constant. Conventional processes can be used to prepare foamed or expanded dielectric insulation. Such processes are described in U.S. Pat. Nos. 3,968,463; 3,975,473; and 4,107,354. The insulation outer diameter ranges from about 0.1 to about 4 inches. Materials which have outstanding electrical properties are preferably used in this application, i.e., polyethylene, polypropylene, fluoropolymers, and blends of these materials. The dielectric insulation is expanded by chemical or physical means, with the latter preferred for superior electrical properties. It is uniformly applied over the inner conductor and preferably has a uniform cell distribution with cells that fall in the range of about 1 micron to about 100 microns. Alternatively, the cable design can be such that high levels of air or other gas are incorporated into the design as in the disc and air design referred to above. The same materials are used for the dielectric insulation in the disc and air design or other coaxial cable designs as are used for the coated design.

Using certain simplified approximations, the velocity of propagation, Vp, for a coaxial cable is estimated using the following equation:

$$V_p = \frac{1}{\sqrt{DC}} * 100\%$$

wherein DC is the dielectric constant of the insulation layer. The velocity of propagation, which provides an indication of the degree to which the insulation material is expanded, ranges from about 75 to about 90 percent for the cables of interest. It is essentially a measure of how fast the signal travels in the cable versus how fast it would travel in a vacuum.

The outer conductor is normally a thin metal layer approximately 0.001 to 0.2 inch in thickness. It must conduct electricity and is usually made of copper or aluminum. The outer conductor can be made by welding or extruding aluminum or copper tape to form a tube and can then be corrugated for additional cable flexibility. Alternatively, it can be comprised of an aluminum or copper braid or foil/braid combination. The braid is used to provide flexibility and some radio frequency shielding. The outer conductor is bonded with an adhesive to the insulation layer for optimum cable performance.

Alkylhydroxyphenylalkanoyl hydrazines are described in U.S. Pat. Nos. 3,660,438 and 3,773,722. A preferred general structural formula for alkylhydroxyphenylalkanoyl hydrazines useful in the invention is as follows:

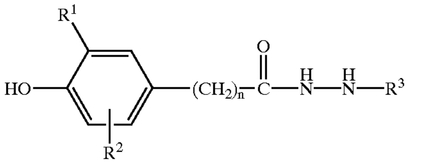

wherein n is 0 or an integer from 1 to 5;

$R^1$ is an alkyl having 1 to 6 carbon atoms;

$R^2$ is hydrogen or $R^1$; and $R^3$ is hydrogen, an alkanoyl having 2 to 18 carbon atoms, or the following structural formula:

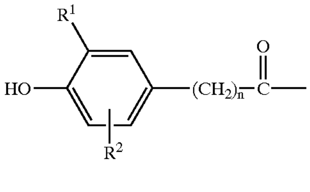

wherein n, $R^1$, and $R^2$ are the same as above, and each $R^1$ and $R^2$ in both formulas can be the same or different.

A preferred alkylhydroxyphenylalkanoyl hydrazine is 1,2-bis(3,5-di-tert-butyl-4-hydroxy-hydrocinnamoyl) hydrazine. The structural formula is:

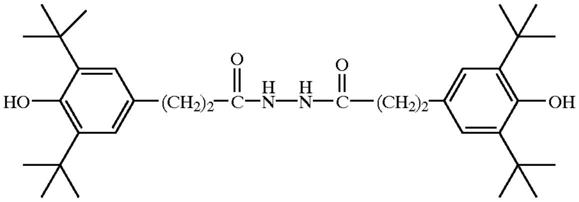

As noted above, the polymers used to prepare the dielectric insulation are polyethylene, polypropylene, fluoropolymers, or blends of two or more of these polymers.

The polyethylene can be a homopolymer of ethylene or a copolymer of ethylene and a minor proportion of one or more alpha-olefins having 3 to 12 carbon atoms, and preferably 4 to 8 carbon atoms, and, optionally, a diene, or a mixture of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

The polyethylene also can be homogeneous or heterogeneous with respect to comonomer distribution. The homogeneous polyethylenes usually have an essentially uniform comonomer distribution. The heterogeneous polyethylenes, on the other hand, do not have a uniform comonomer distribution. The polyethylene can have a broad molecular weight distribution, characterized by a polydispersity (Mw/Mn) greater than 3.5, or a narrow molecular weight distribution, characterized by a polydispersity (Mw/Mn) in the range of about 1.5 to about 3.5. Mw is defined as weight average molecular weight and Mn is defined as number average molecular weight. They can be a single type of polyethylene or a blend or mixture of more than one type of polyethylene. Thus, it may be characterized by either single or multiple DSC melting points. The polyethylenes can have a density in the range of 0.860 to 0.980 gram per cubic centimeter, and preferably have a density in the range of 0.870 to about 0.970 gram per cubic centimeter. They also can have a melt index in the range of about 0.1 to about 50 grams per 10 minutes.

The polyethylenes can be produced by low or high pressure processes. They are preferably produced in the gas phase, but they can also be produced in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. Nos. 4,508,842 (heterogeneous polyethylenes) and 5,332,793; 5,342,907; and 5,410,003 (homogeneous polyethylenes); a chromium based catalyst system such as that described in U.S. Pat. No. 4,101,445; a metallocene catalyst system such as that described in U.S. Pat. Nos. 4,937,299 and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here.

Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), and high density polyethylene (HDPE) having a density greater than 0.940 gram per cubic centimeter. The latter four polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 degrees C., and in the tubular reactor, the pressure is in the range of about 25,000 to about 45,000 psi and the temperature is in the range of about 200 to about 350 degrees C.

The polypropylene can be a homopolymer or a copolymer of propylene and ethylene, 1-butene, 1-hexene, 4-methyl-1-pentene, or 1-octene wherein the propylene is present in an amount of at least about 60 percent by weight, and can be produced using catalysts similar to those used for the preparation of polyethylene, usually those utilizing inside and outside electron donors. See, for example, U.S. Pat. Nos. 4,414,132 and 5,093,415. The polypropylene can also have a DSC melting point above the mixing temperature, preferably higher than about 140 degrees C. The density of the polypropylene can be in the range of 0.870 to about 0.915 gram per cubic centimeter, and is preferably in the range of 0.880 to 0.905 gram per cubic centimeter. The melt flow can be in the range of about 0.5 to about 20 decigrams per minute, and is preferably in the range of about 0.7 to about 10 decigrams per minute. Melt flow is determined in accordance with ASTM D-1238, Condition E, measured at 230 degrees C., and is reported in decigrams per minute. Impact polypropylenes, random copolymers of propylene, and block copolymers of propylene can also be used, if desired. See, for example, U.S. Pat. No. 4,882,380.

The fluoropolymers can be exemplified by PTFE (polytetrafluoroethylene) and FEP (copolymer of tetrafluoroethylene and hexafluoropropylene). The properties of these fluoropolymers and processes for making them are contained in Process Economics Program Report No. 166A by SRI International, and in the patents and references cited in the Report.

Conventional additives can be added to the polymer(s) either before or during processing. The amount of additive is usually in the range of about 0.01 to about 5 percent by weight based on the weight of the resin. Useful additives include processing aids, lubricants, stabilizers, foaming aids, nucleating agents, surfactants, flow aids, and viscosity control agents. Nucleating agents in this context refers to (a) additives that enhance the ability of gas bubbles to form in the polymer during the foaming process (examples include azodicarbonamide, PTFE, and boron nitride); or (b) additives that modify the crystallization behavior of polymers (examples include talc, sodium succinate, and aluminum benzoate). Examples of stabilizers include phosphites, hindered phenols, hindered amines, and thioesters.

Advantages of the invention are low dissipation factor, low signal attenuation, and high velocity of propagation.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

All molecular weights mentioned in this specification are weight average molecular weights unless otherwise designated.

The patents mentioned in this specification are incorporated by reference herein.

The invention is illustrated by the following examples.

EXAMPLES

The following Table highlights the performance of 1,2-bis(3,5-di-tert-butyl-4-hydroxy-hydrocinnamoyl)hydrazine (Stabilizer A) relative to several commonly used stabilizers and stabilizer combinations. The substantially lower dissipation factor value of the Stabilizer A modified resin is to be noted. Unstabilized HDPE (high density polyethylene) has a dielectric constant of 2.361 and a dissipation factor of 16 microradians. Stabilizer E (see below) is included in the evaluation and found to be inferior to Stabilizer A confirming its unique and surprising effectiveness. In each case, an HDPE (density=0.96 gram per cubic centimeter; melt index=8 grams per 10 minutes) is compounded with the indicated stabilizer at 160 degrees C. for five minutes, then plaqued according to ASTM D1928, Procedure C, to produce a 50 mil plaque. Electrical property testing at 1 MHz is completed using a resonant cavity apparatus ("Q Meter") and tested according to ASTM D1531.

The various stabilizers used in this example are as follows:

Stabilizer A (used in the embodiment of the invention) is:

1,2-bis(3,5-di-tert-butyl-4-hydroxyhydrocinnamoyl)hydrazine

Stabilizer B is:

tetrakis [methylene(3,5-di-tert-butyl-4-hydroxyhydrocinnamate)]methane

Stabilizer C is:

1,3,5-Tris(4-tert-butyl-3-hydroxy-2,6-dimethylbenzyl)-1,3,5-triazine-2,4,6-(1H, 3H, 5H)-trione Stabilizer D is:

1,3,5-trimethyl-2,4,6-tris(3,5-di-tert-butyl-4-hydroxybenzyl)benzene

Stabilizer E is:

2,2'-oxamido bis-[ethyl 3-(3,5-di-tert-butyl-4-hydroxyphenyl)propionate]

Stabilizer F is:

N,N' Hexamethylene bis(3,5-di-tert-butyl-4-hydroxyhydrocinnamamide)

Stabilizer G is:

Tris-(3,5-di-tert-butyl-4-hydroxybenzyl)isocyanurate

Stabilizer H is:

Thiodiethylene bis-(3,5-di-tert-butyl-4-hydroxy)hydrocinnamate

Stabilizer I is:

5,7-di-t-butyl-3-(2,3-di-methylphenyl)-3H-benzofuran-2-one

Stabilizer J is:

tris(2,4-di-tert-butylphenyl)phosphite

TABLE

| Stabilizer | percent by weight based on the weight of the resin | dielectric constant (1 MHz) | dissipation factor (1 MHz) (microradians) |
|---|---|---|---|
| A | 0.1 | 2.36 | 14 |
| B | 0.1 | 2.36 | 48 |
| C | 0.1 | 2.36 | 29 |
| D | 0.1 | 2.36 | 37 |
| E | 0.1 | 2.36 | 39 |
| F | 0.1 | 2.36 | 33 |
| G | 0.1 | 2.36 | 29 |
| H | 0.1 | 2.36 | 62 |
| I plus B | 0.05 plus 0.1 | 2.37 | 139 |
| J plus B | 0.1 plus 0.1 | 2.37 | 46 |
| none | — | 2.36 | 16 |

It is also noted that the Stabilizer A/resin combination has a lower dissipation factor than of Stabilizers B through J/resin combination. The stabilizer/resin combinations are also tested for long term thermal stabilization and the Stabilizer A/resin combination is found to be equal to or better than the other Stabilizer/resin combinations. The resin per se, of course, fails the long term thermal stabilization test.

What is claimed is:

1. A coaxial cable construction comprising (i) an inner electrical conductor comprising a single electrical conductor or a core of two or more electrical conductors;

(ii) dielectric insulation comprising an inert gas or air and a solid, said solid comprising (a) a polymer selected from the group consisting of polyethylene, polypropylene, fluoropolymers, and mixtures of two or more of said polymers and (b) an alkylhydroxyphenylalkanoyl hydrazine; and (iii) an outer electrical conductor.

2. The cable construction defined in claim 1 wherein the alkylhydroxyphenylalkanoyl hydrazine is

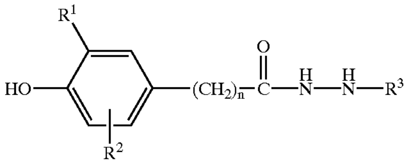

wherein n is 0 or an integer from 1 to 5;

$R^1$ is an alkyl having 1 to 6 carbon atoms;

$R^2$ is hydrogen or $R^1$; and $R^3$ is hydrogen, an alkanoyl having 2 to 18 carbon atoms, or the following structural formula:

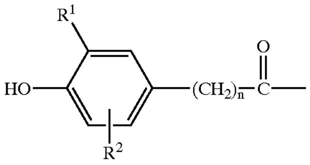

wherein n, $R^1$, and $R^2$ are the same as above, and each $R^1$ and $R^2$ in both formulas can be the same or different.

3. The cable construction defined in claim 2 wherein the alkylhydroxyphenylalkanoyl hydrazine is 1,2-bis(3,5-di-tert-butyl-4-hydroxy-hydrocinnamoyl)hydrazine.

4. The cable construction defined in claim 1 wherein the dielectric insulation is foamed.

5. The cable construction defined in claim 1 wherein the dielectric insulation is a disc and air design.

6. The cable construction defined in claim 1 wherein the resin used in the dielectric insulation is polyethylene.

7. A coaxial cable construction comprising (i) an inner electrical conductor comprising a single electrical conductor or a core of two or more electrical conductors;

(ii) a foamed dielectric insulation comprising an inert gas or air and a solid, said solid comprising (a) polyethylene and (b) 1,2-bis(3,5-di-tert-butyl-4-hydroxy-hydrocinnamoyl)hydrazine ; and (iii) an outer electrical conductor.

* * * * *